Figure 2:
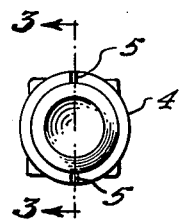

June 6, 1961    J. R. CARTLIDGE    2,987,091
SET SCREW CONSTRUCTION
Filed Aug. 8, 1957

INVENTOR.
JOHN R. CARTLIDGE,
BY
ATTORNEYS.

# United States Patent Office 2,987,091
Patented June 6, 1961

2,987,091
SET SCREW CONSTRUCTION
John R. Cartlidge, Bridgetown, Ohio, assignor to The Cincinnati Mine Machinery Co., Cincinnati, Ohio, a corporation of Ohio
Filed Aug. 8, 1957, Ser. No. 677,054
2 Claims. (Cl. 151—14)

The invention relates to the general problem of increasing the holding power of set screws. It will be described in connection with the provision of set screws for mining machinery, it being understood that this specific field of utility does not constitute a limitation on the invention.

In mining machinery, the shanks of cutter bits or cutter bit holders are usually held in the openings of socket members on cutter chains or driven heads by set screws threaded into transverse bores in the socket members. These various elements are, in use, subject to excessive vibrations and strains, so that ordinary set screws frequently become loosened. The art has turned its attention to means for increasing the holding power of the set screws without, however, completely solving the problem. Positive locking means are, of course, unavailable, since the set screws must be capable of retraction every time a change of bits is necessary and every time an adjustment in the gauge of the cut has to be made.

The set screws are not only subject to rapid wear, but in many uses are continually wetted with mine waters which, as is well known, are frequently acid in composition. These conditions make for erosion and corrosion, not only of the set screws themselves but also of the threaded bores in the socket members. To be fully satisfactory the set screws must be capable of compensating in substantial measure for wear and corrosion.

It has hitherto been suggested to split the ends of set screws with one or more slots, and to expand the segments so produced, so that the set screws will be resiliently oversize. This increases the tightness of engagement of the set screw in the threaded bore and may compensate to a degree for wear and corrosion. The expedient has not been successful, however, because it interferes with the proper bearing of the ends of the set screws against the work piece to be held, e.g. the shank of the cutter bit or holder. Not only does the divided end of the set screw fail to engage the work piece with the firmness of a solid nose, but the segmental portions under some circumstances may bend, break, spall or catch on the work piece.

It has also been hitherto suggested to divide the inner end of the set screw, provide the set screw with a longitudinal bore, and place in this bore an element having a nose portion and a shank, the nose portion having a conical part located adjacent the set screw end, and the segments of the set screw being correspondingly shaped to bear on the conical part of the nose portion. In the use of such a structure the outer end of the nose portion comes against the work piece, and as the set screw is tightened, the divided segments of it are expanded by the conical part. This makes for a tight engagement of the set screw in the threaded bore and an adequate holding of the work piece; but the structure has a strong tendency to jam, and is not readily loosened when it is desired to change bits or adjust gauge. Frequent breakage of the set screws is encountered. The difficulty is exaggerated under conditions of corrosion.

A primary object of the invention is the provision of a set screw which has greatly increased holding power but is free from the disadvantages set forth above.

It is an object of the invention to provide a set screw which compensates for wear and corrosion, and engages the work adequately, while being free from jamming and breakage upon deliberate loosening or removal.

It is also an object of the invention to provide a set screw of the type wherein the body portion is separate from the nose portion, wherein the nose portion has no function in expanding segments of the body portion, but which is at the same time a structure in which the nose portion so engages the body portion that transverse strains will subject the nose portion to shear, to the end that a small shank portion may be employed to hold the parts together.

Figure 1:
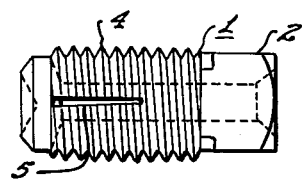
Figure 3:
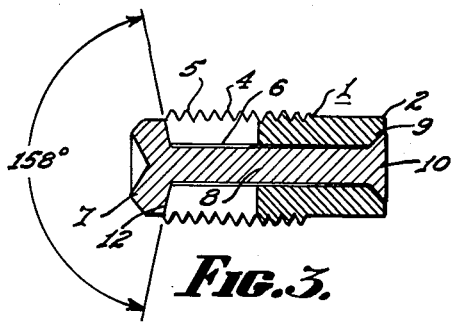
Figure 4:
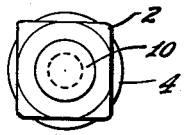
Figure 5:
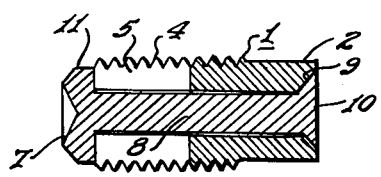

These and other objects of the invention, which will be set forth hereinafter or will be apparent to one skilled in the art upon reading these specifications, are accomplished in that structure of which certain exemplary embodiments will now be described. Reference is made to the accompanying drawings wherein:

FIG. 1 is a side elevation of a preferred form of the device of this invention.
FIG. 2 is an end elevational view taken from the nose portion of the device.
FIG. 3 is a longitudinal sectional view taken along the section line 3—3 of FIG. 2.
FIG. 4 is an end elevational view taken from the head end of the device.
FIG. 5 is a sectional view similar to that of FIG. 3, but showing a modified structure having a flat surface on the inner side of the nose portion.

Referring to the various figures, the improved set screw of this invention comprises a body part 1 having an end 2 which is squared or otherwise configured for engagement by a wrench or other turning tool. The remainder of the set screw body is threaded as indicated at 4 in the drawings. The inner end of the set screw is split by one or more slits 5 so as to be divided into two or more segments.

The body of the set screw will be made of suitable metallic material, usually but not necessarily steel, and having substantial resilience. The body is provided with a central bore indicated in FIG. 3 at 6. The divided end portions of the threaded body are spread apart (normally after threading). The spreading may be varied with the nature of the set screw and the length of the segments. By way of example, with a set screw designed for use in mining machinery and having a body diameter of about ¾ in., a spreading of the segments of .030 in. will be found satisfactory. A greater or lesser degree of spreading may, however, be adopted.

In view of the spreading of the segments of the set screw body, the first two or three threads at the inner end of the body will be died down to a lesser diameter (e.g. the diameter of the set screw before the spreading of the segments) in order to facilitate the starting of the set screw into the threaded bore of a socket member.

The second part of the set screw construction of this invention is a member comprising a nose part 7 and an integral shank 8. The shank is placed in the bore of the set screw body as shown. It is usually desirable to fasten the two parts of the set screw together permanently. To this end the shank 8 may be extended beyond the portion 2 of the body, and headed, provided with a cotter pin, provided with a nut, or otherwise held against withdrawal through the bore. Preferably the outer end of the bore of the set screw body is countersunk as indicated at 9, and the shank 8 is headed as at 10 so that the head does not extend substantially if at all beyond the end of the body of the set screw.

The shape of the outer end of the nose portion 7 does not constitute a limitation on the invention. For various uses it may be concave or convex, or flat, or otherwise configured.

As shown in FIG. 5 at 11, the inner face of the nose portion 7 may be made flat. In this form it provides an adequate bearing for the ends of the segments of the set screw, and the primary purposes of the invention will be attained. The ends of the segments have an adequate bearing upon the nose portion, which in turn has an adequate bearing on the work piece; and the disadvantages of prior split and expanded set screws are thereby fully overcome.

In some operations, especially where the work piece is likely to exert substantial transverse strains on the nose portion of the set screw, it is of advantage to make the inner face of the nose portion slightly conical. This is illustrated at 12 in FIG. 3. The angularity of opposite portions of the conical surface should, however, not be less than about 158° as diagrammed in FIGURE 3. The ends of the segmental portions of the body of the set screw are preferably shaped to correspond with the conical surface of the nose portion.

Where the angularity as aforesaid is substantially 158° or greater, the nose portion of the structure exerts no expanding effect upon the segments. At the same time, the slightly conical configuration of the parts causes the nose portion of the device to be subjected to shear if it is acted upon by forces transverse to the axis of the set screw. Under these circumstances reliance is not placed upon the thickness and strength of the shank 8 to hold the nose piece in position. Consequently, the shank 8 may be made quite thin and the bore 6 correspondingly smaller with consequent gain in the strength of the body.

The set screw of this invention will normally be used and is preferably used in a threaded bore in a socket member, the dimensions of the parts and of the work piece being such that when the set screw is turned fully home with the nose portion engaging the work piece, the segmental parts of the set screw body will lie wholly within the threaded bore of the socket member.

Modifications may be made in the structure of this invention without departing from the spirit of it. For example, the two parts of the set screw construction need not necessarily be held permanently together as is preferred. The set screw body may be bored only partially through its length, and the shank 8 may be correspondingly foreshortened, and merely thrust into the bore.

The invention having been described in certain exemplary embodiments, what is claimed as new and desired to be secured by Letters Patent is:

1. A set screw comprising a first element which is a body having a threaded end and an end shaped for engagement by a turning tool, the said threaded end having at least one slot dividing it into segments, said segments being resiliently expanded with respect to each other, and a second element having a head serving as an engagement nose for said set screw, said head having a rear surface engaging the ends of said segments in a frictional, non-expanding relationship, said rear surface of said head and said ends of said segments being conical surfaces, the angular relationship of opposite sides of said surfaces being not less than substantially 158°.

2. In a set screw, a first element having a threaded end and an end shaped for engagement by a turning tool, said element having a longitudinal perforation, a second element comprising a head serving as a nose for said set screw, and a shank located in the perforation of said first element, the threaded end of said first element having at least one slit therein whereby it is rendered expansible, and said slitted end being in expanded condition and resilient, the rear surface of said head providing a seat for engaging the end of said first element in a non-expanding, frictional relationship, said rear surface of said head and said end of said first element being conical surfaces, opposite portions of said conical surfaces having an angularity to each other of not less than 158°.

References Cited in the file of this patent

UNITED STATES PATENTS

| | | |
|---|---|---|
| 1,581,096 | Barnes | Apr. 20, 1926 |
| 1,767,287 | Hosking | June 24, 1930 |
| 2,273,102 | Harris et al. | Feb. 17, 1942 |
| 2,354,160 | Wallgren | July 18, 1944 |
| 2,355,899 | Beede | Aug. 15, 1944 |
| 2,355,900 | Beede | Aug. 15, 1944 |
| 2,407,160 | Kahn | Sept. 3, 1946 |

FOREIGN PATENTS

| | | |
|---|---|---|
| 662,144 | Great Britain | Dec. 5, 1951 |